US012603846B2

(12) United States Patent (10) Patent No.: US 12,603,846 B2
Yang et al. (45) Date of Patent: Apr. 14, 2026

(54) SYSTEMS AND METHODS FOR EDGE-TO-EDGE QUALITY OF SERVICE FLOW CONTROL IN NETWORK SLICES

(71) Applicant: Verizon Patent and Licensing Inc., Basking Ridge, NJ (US)

(72) Inventors: Jin Yang, Orinda, CA (US); Ye Huang, San Ramon, CA (US); Raquel Morera Sempere, Weehawken, NJ (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 465 days.

(21) Appl. No.: 18/166,175

(22) Filed: Feb. 8, 2023

(65) Prior Publication Data

US 2024/0267336 A1 Aug. 8, 2024

(51) Int. Cl.
H04L 47/2483 (2022.01)
H04L 47/20 (2022.01)
H04W 28/02 (2009.01)

(52) U.S. Cl.
CPC .......... *H04L 47/2483* (2013.01); *H04L 47/20* (2013.01); *H04W 28/0226* (2013.01)

(58) Field of Classification Search
None
See application file for complete search history.

(56) References Cited

U.S. PATENT DOCUMENTS

2023/0309002 A1* 9/2023 Zhang .................... H04L 67/55
2024/0137890 A1* 4/2024 Bertz ................... H04W 60/005
2024/0224111 A1* 7/2024 Mangrulkar ...... H04W 28/0268

* cited by examiner

*Primary Examiner* — Christine T Duong

(57) ABSTRACT

A device may include a processor configured to provide an interface to enable a user equipment (UE) device to request a data flow in a network slice via a network exposure function (NEF). The processor may be further configured to receive a request from the UE device via the provided interface to create a data flow in the network slice, wherein the data flow is associated with a Quality of Service (QOS) characteristic; map the QoS characteristic to a QoS identifier; and create a data flow associated with the QoS identifier in a communication session associated with the UE device in the network slice.

20 Claims, 13 Drawing Sheets

130

400

INPUT DEVICE 440

OUTPUT DEVICE 450

COMMUNICATION INTERFACE 460

PROCESSOR 420

MEMORY 430

410

260 ⎯

600

700

710 — ADMIT A UE DEVICE TO A NETWORK SLICE

720 — ESTABLISH A PDU SESSION FOR THE UE DEVICE IN THE NETWORK SLICE

730 — CREATE A DEDICATED QoS DATA FLOW IN THE ESTABLISHED PDU SESSION

740 — CREATE A BEST EFFORT QoS DATA FLOW IN THE ESTABLISHED PDU SESSION

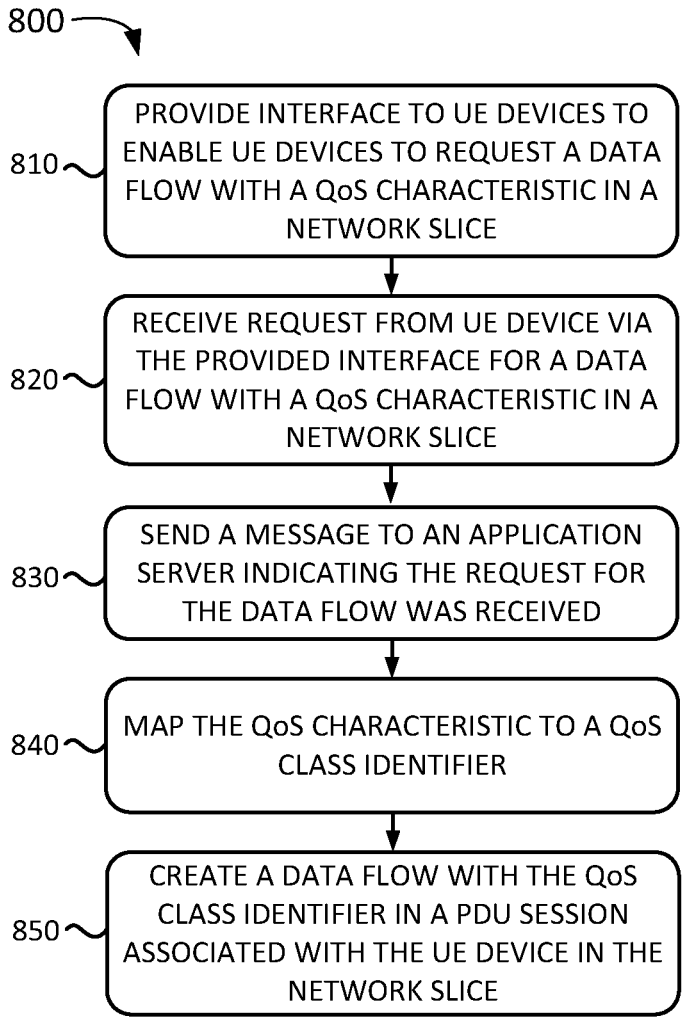

800

810 — PROVIDE INTERFACE TO UE DEVICES TO ENABLE UE DEVICES TO REQUEST A DATA FLOW WITH A QoS CHARACTERISTIC IN A NETWORK SLICE

820 — RECEIVE REQUEST FROM UE DEVICE VIA THE PROVIDED INTERFACE FOR A DATA FLOW WITH A QoS CHARACTERISTIC IN A NETWORK SLICE

830 — SEND A MESSAGE TO AN APPLICATION SERVER INDICATING THE REQUEST FOR THE DATA FLOW WAS RECEIVED

840 — MAP THE QoS CHARACTERISTIC TO A QoS CLASS IDENTIFIER

850 — CREATE A DATA FLOW WITH THE QoS CLASS IDENTIFIER IN A PDU SESSION ASSOCIATED WITH THE UE DEVICE IN THE NETWORK SLICE

910    RECEIVE REQUEST TO PERFORM SLICE ADMISSION FOR A NETWORK SLICE

920    IMPLEMENTING A SLICE ADMISSION POLICY FOR THE NETWORK SLICE

930    RECEIVE A REQUEST TO TRANSPORT A DATA FLOW FOR A UE DEVICE THROUGH A RAN

940    IMPLEMENTING TRANSPORT OF THE DATA FLOW FOR THE UE DEVICE THROUGH THE RAN

1200

| NETWORK SLICE | GAMING | |
|---|---|---|
| QCI 8 | BEST EFFORT, FIRMWARE UPDATE, APPLICATION DOWNLOAD | |
| QCI 133 | LOW LATENCY FOR REAL-TIME GAMING | |
| QCI 80 | LOW LATENCY FOR AUGMENTED AND VIRTUAL REALITY | |

~1210

| NETWORK SLICE | V2X | |
|---|---|---|
| QCI 8 | BEST EFFORT, AUTOMOBILE FIRMWARE UPDATE | |
| QCI 133 | LOW LATENCY SAFETY MESSAGES | |
| QCI 179 | LOW LATENCY COLLISION AVOIDANCE MESSAGES | |

SYSTEMS AND METHODS FOR EDGE-TO-EDGE QUALITY OF SERVICE FLOW CONTROL IN NETWORK SLICES

BACKGROUND INFORMATION

To satisfy the needs and demands of users of mobile communication devices, providers of wireless communication services continue to improve and expand their networks. One aspect of such improvements includes the development of wireless access networks and options to utilize such wireless access networks. A provider may operate a wireless access network that manages a large number of user devices using different types of services. Managing different types of services poses various challenges.

BRIEF DESCRIPTION OF THE DRAWINGS

FIG. 8 illustrates a flowchart for creating a data flow with a Quality of Service (QOS) characteristic in a network slice according to an implementation described herein;

FIG. 12 illustrates an exemplary set of network slices with multiple QoS classes according to an implementation described herein.

DETAILED DESCRIPTION OF EMBODIMENTS

Figure 1:
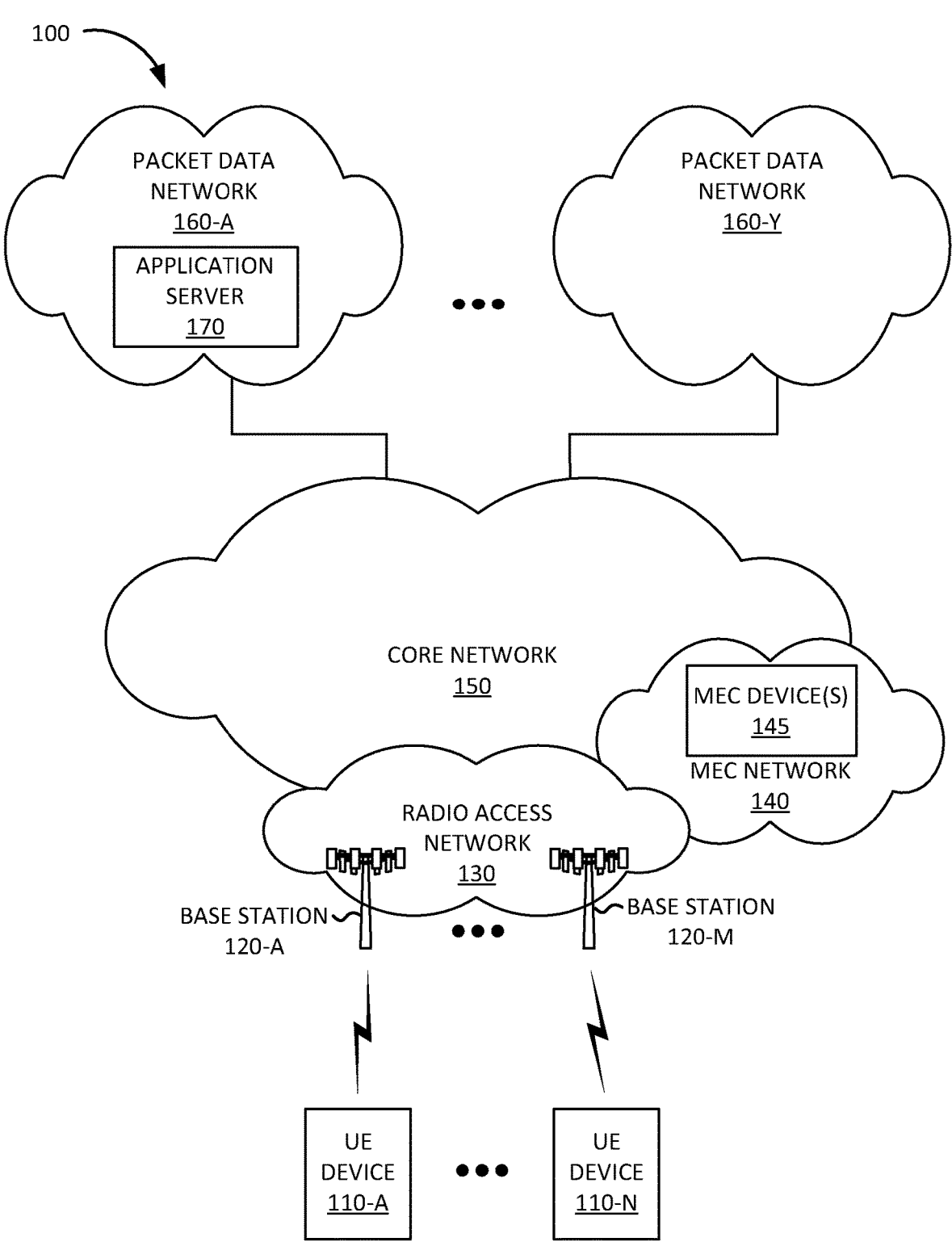
FIG. 1 illustrates an environment according to an implementation described herein.

The following detailed description refers to the accompanying drawings. The same reference numbers in different drawings identify the same or similar elements.

An important feature of next generation cellular wireless network, such as, for example, a Fifth Generation (5G) network, is network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources. Each network slice may be configured to implement a different set of requirements and/or priorities and/or may be associated with a particular Quality of Service (QOS) class, type of service, security requirement, and/or particular enterprise customer associated with a set of user equipment (UE) devices.

Examples of network slices that may be implemented in a 5G network include a default network slice used for sessions not associated with other particular network slices; an enhanced Mobile Broadband (eMBB) network slice for Voice over Internet Protocol (VOIP) telephone calls and/or data sessions for accessing Internet websites; a massive Internet of Things (IoT) network slice for IoT devices; and an Ultra-Reliable Low Latency Communication (URLLC) network slice for URLLC communication, such as medical monitoring devices, autonomous vehicles, industrial automation, etc.; and/or other types of network slices. Furthermore, different applications may be associated with different network slices. For example, a gaming application may be associated with a first network slice, a vehicle to everything (V2X) may be associated with a second network slice, etc.

A UE device admitted to a network slice may establish a Protocol Data Unit (PDU) session in the network slice. The established PDU session may be used by the UE device for all the data traffic sent or received by the UE device and may be assigned to a particular QoS class. A PDU session may be established over, for example, a data radio bearer (DRB) from the UE device to the base station and a General Packet Radio Service (GPRS) Tunneling Protocol (GTP) tunnel from the base station to a network gateway, which is implemented by a network function (NF) called User Plane Function (UPF) in a 5G core network. Thus, all traffic in the network slice to and from the UE device may be transmitted through the GTP tunnel associated with the PDU session. However, not all data traffic on the network slice need be assigned to the same QoS class. For example, a gaming network slice may have a latency requirement for game session data, but may also use the network slice to update a gaming application on the UE device. The update may not require low latency communication and may be provided to UE device as best effort data traffic. Thus, data flows assigned to different QoS classes may need to be created for a UE device conducting a PDU session with a network slice.

Implementations described herein relate to systems and methods for edge-to-edge (E2E) QoS flow control in network slices. A Radio Access Network (RAN), and a core network associated with the RAN, may implement and manage multiple network slices and each of the network slices may implement E2E QoS flow control that enables multiple data flows, associated with different QoS classes, in a communication session in the network slice. For example, the RAN and/or core network may admit a UE device to a network slice and establish a Protocol Data Unit (PDU) session for the UE device in the network slice, in response to admitting the UE to the network slice. The network slice may be associated with a default QoS class and the core network may create a dedicated data flow within the established PDU session with a QoS class identifier (QCI) associated with the default QoS class. Additionally, the core network may automatically create a best effort QoS data flow within the established PDU session. The best effort QoS data flow may be used for best effort delivery of traffic within the network slice and/or for traffic that is not associated with a particular service requirement, such as traffic to update an application on the UE device, traffic to update a firmware on the UE device, etc.

Furthermore, the core network may enable the UE device to request additional data flows, with particular QoS characteristics, in the network slice. For example, a Network Exposure Function (NEF) in a core network may be configured to provide an interface to enable a UE device to request a data flow, with a QoS characteristic, in a network slice. The NEF may receive a request from the UE device via the provided interface to create a data flow, in the network slice, with a QoS characteristic. The QoS characteristic may include, for example, a QoS class identifier (ID); a service requirement, such as a latency requirement, a throughput requirement, a security requirement, an error rate requirement, a packet delivery rate requirement, and/or another type of service requirement; an application ID and/or an application type ID; a Data Network Name (DNN); a destination Internet Protocol (IP) address; whether a data flow is to be routed to a Multi-access Edge Computing (MEC) network; and/or another type of QoS characteristic.

The NEF may send an instruction to a Policy Control Function (PCF) to create a data flow, with the QoS characteristic, in the network slice for the UE device. Furthermore, the NEF may send an indication, that the request to create the data flow has been received from the UE device, to an application server device in a data network associated with the communication session. The PCF may map the QoS characteristic to a QCI, such as, for example, a 5G QCI (5QI), and create a data flow with the QCI in the PDU session associated with the UE device in the network slice. For example, the PCF may send an instruction to create the data flow (with the QCI), in the PDU session associated with the UE device in the network slice, to a Session Management Function (SMF) managing the PDU session. The SMF may then send an instruction to create the data flow to the User Plane Function (UPF) associated with the PDU session.

Furthermore, the PCF may create a traffic flow template (TFT) for the data flow and provide, via an Access and Mobility Function (AMF), the created TFT to the UE device. The UE device may use the TFT to assign data packets to the data flow. For example, the TFT may include a tuple, such as a 5-tuple that includes a source IP address, a source port, a destination IP address, a destination port, and a protocol, associated with the created data flow.

Additionally, the PCF may provide, via the AMF, information identifying the data flow to one or more devices in the RAN. For example, the PCF may provide, via the AMF, the information identifying the data flow to a base station (e.g., a gNodeB) and/or to a Central Unit Control Plane (CU-CP) servicing the UE device. RAN controllers in the gNodeB and/or CU-CP may implement transport of the data flow from the UE device to the core network based on the received information.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120") in RAN 130, MEC network 140 (which includes MEC devices 145), core network 150, and packet data networks (PDNs) 160-A to 160-Y (referred to herein collectively as "PDNs 160" and individually as "PDN 160").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. In some implementations, UE device 110 may communicate using machine-to-machine (M2M) communication, such as Machine Type Communication (MTC), and/or another type of M2M communication for IoT applications.

RAN 130 may include base stations 120. Base station 120 may be configured for one or more Radio Access Technology (RAT) types. For example, base station 120 may include a 5G New Radio (NR) base station (e.g., a gNodeB) and/or a Fourth Generation (4G) Long Term Evolution (LTE) base station (e.g., an eNodeB). Each base station 120 may include devices and/or components that enable cellular wireless communication with UE devices 110. For example, base station 120 may include a radio frequency (RF) transceiver configured to communicate with UE devices 110 using a 5G NR air interface, a 4G LTE air interface, and/or using another type of cellular air interface. Base station 120 may enable UE device 110 to communicate with core network 150.

MEC network 140 may be associated with one or more base stations 120 and may provide MEC services for UE devices 110 attached to the base stations 120. MEC network 140 may be in proximity to base stations 120 from a geographic and network topology perspective, thus enabling low latency communication with UE devices 110 and/or base stations 120. As an example, MEC network 140 may be located on the same site as base station 120. As another example, MEC network 140 may be geographically closer to one of base stations 120 and reachable via fewer network hops and/or fewer switches, than other base stations 120.

MEC network 140 may include one or more MEC devices 145. MEC devices 145 may provide MEC services to UE devices 110. A MEC service may include, for example, a low-latency microservice associated with a particular application, such as, for example, a user authentication microservice, a navigation microservice, an online shopping microservice, a content delivery microservice, a gaming microservice, a virtual and/or augmented reality microservice, a health monitoring microservice, and/or another type of microservice. As another example, a MEC service may include a microservice associated with a virtualized network function (VNF) of core network 150. As yet another example, a MEC service may include a cloud computing service, such as cache storage service, artificial intelligence (AI) accelerator service, machine learning service, an image process service, a data compression service, a locally centralized gaming service, a Graphics Processing Units (GPUs) and/or other types of hardware accelerator service, and/or other types of cloud computing services. UE device 110 may request a data flow with a QoS characteristic. The request may indicate, for example, that the data flow is to be created with MEC device 145.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and PDN 160. In some implementations, core network 150 may include a 5G core network. Exemplary components of a 5G core network are described below with reference to FIG. 2. In other implementations, core network 150 may include a 4G core network (e.g., an evolved packet core (EPC) network) and/or another type of core network.

The components of core network 150 may be implemented as dedicated hardware components or as virtualized functions implemented on top of a common shared physical infrastructure using SDN. For example, an SDN controller may implement one or more of the components of core network 150 using an adapter implementing a virtual network function (VNF) virtual machine, a Cloud Native Function (CNF) container, an event driven serverless architecture interface, and/or another type of SDN component. The common shared physical infrastructure may be implemented using one or more devices 400 described below with reference to FIG. 4 in a cloud computing center associated with core network 150. Additionally, or alternatively, some, or all, of the shared physical infrastructure may be implemented using one or more devices 400 implemented in MEC device 145 in MEC network 140.

PDNs 160-A to 160-Y may each include a PDN. A particular PDN 160 may be associated with a Data Network Name (DNN) in 5G, and/or an Access Point Name (APN) in 4G. A UE device may request a connection to PDN 160 using a DNN or an APN. PDN 160 may include, and/or be connected to, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

PDN 160 may include an application server 170 (shown in PDN 160-A in FIG. 1 for illustrative purposes). Application server 170 may provide services for an application running on UE device 110 and may establish an application session with UE device 10 via RAN 130 and core network 150. Application server 170 may communicate with an NEF in core network 150 to establish a data flow with a QoS characteristic and/or to receive information from the NEF relating to a data flow with a QoS characteristic requested by UE device 110. Application server 170 may establish a data flow with the QoS characteristic via packet data network 160 to core network 150.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
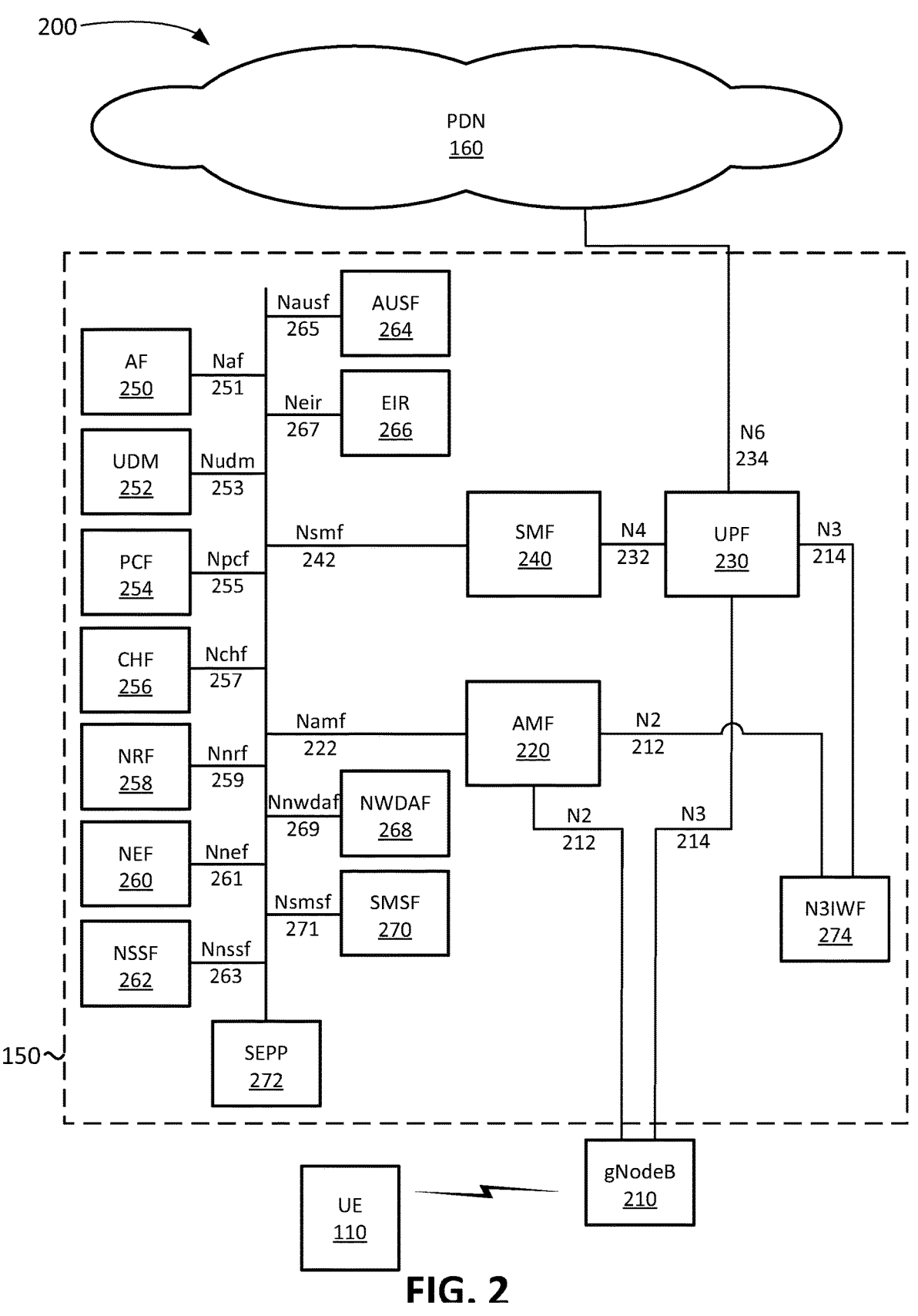
FIG. 2 is a diagram illustrating exemplary components of a Fifth Generation (5G) core network according to an implementation described herein.

FIG. 2 illustrates a system 200 that includes exemplary components of core network 150 in the context of environment 100 according to an implementation described herein. As shown in FIG. 2, system 200 may include UE device 110, gNodeB 210, core network 150, and PDN 160.

gNodeB 210 (corresponding to base station 120) may include devices (e.g., base stations) and components that enable UE device 110 to connect to core network 150 via RAN 130 using 5G NR RAT. For example, gNodeB 210 may service one or more cells, with each cell being served by a wireless transceiver with an antenna array configured for mm-wave wireless communication. gNodeB 210 may communicate with AMF 220 using an N2 interface 212 and communicate with UPF 230 using an N3 interface 214. gNodeB 210 may include a RAN controller that performs network slice admission and management of data flows associated with different QoS requirements in a network slice.

Core network 150 may include an Access and Mobility Function (AMF) 220, a User Plane Function (UPF) 230, a Session Management Function (SMF) 240, an Application Function (AF) 250, a Unified Data Management (UDM) 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

While FIG. 2 depicts a single AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, and N3IWF 274 for illustration purposes, in practice, core network 150 may include multiple AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, SMSFs 270, SEPPs 272, and/or N3IWFs 274.

AMF 220 may perform registration management, connection management, reachability management, mobility management, lawful intercepts, SMS transport between UE device 110 and SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU) point of interconnect to a particular data network (e.g., PDN 160), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 210), and/or perform other types of user plane processes. UPF 230 may communicate with SMF 240 using an N4 interface 232 and connect to PDN 160 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate charging data collection, terminate session management parts of Non-Access Stratum (NAS) messages, perform downlink data notification, manage roaming, and/or perform other types of control plane processes for managing user plane data. SMF 240 may be accessible via an Nsmf interface 242. SMF may receive a request from PCF 254 to create a data flow with a particular QCI in a PDU session in a network slice and may create and manage the data flow.

AF 250 may provide services associated with a particular application, such as, for example, an application for influencing traffic routing, an application for accessing NEF 260, an application for interacting with a policy framework for policy control, and/or other types of applications. AF 250 may be accessible via an Naf interface 251, also referred to as an NG5 interface. In some implementations, AF 250 may correspond to, or interface with application server 170.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may receive a request from NEF 260 to create a data flow with a QoS characteristic in a network slice, map the QoS characteristic to a QCI, and create the data flow in the network slice. For example, PCF 254 may instruct SMF 240 to create the data flow. Furthermore, PCF 254 may generate a TFT for the data flow and send the TFT to UE device 110 via AMF 220. Additionally, PCF 254 may provide information relating to the data flow to one or more RAN devices, such as gNodeB 210, a CU-CP, etc. PCF 254 may be accessible via Npcf interface 255. CHF 256 may perform charging and/or billing functions for core network 150. For example, CHF 256 may generate a charging record for UE device 110 based on data flow information associated with UE device 110. CHF 256 may be accessible via Nchf interface 257.

NRF 258 may support a service discovery function and maintain profiles of available network function (NF) instances and their supported services. An NF profile may include, for example, an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. NRF 258 may be accessible via an Nnrf interface 259.

NEF 260 may expose capabilities and events to other NFs, including third party NFS, AFs, edge computing NFs, and/or other types of NFs. Furthermore, NEF 260 may secure provisioning of information from external applications to core network 150, translate information between core network 150 and devices/networks external to core network 150, support a Packet Flow Description (PFD) function, and/or perform other types of network exposure functions. NEF 260 may be accessible via Nnef interface 261. NEF 260 may provide an interface to UE device 110 to enable UE device 110 to request a data flow, with a QoS characteristic, in a network slice. NEF 260 may then send a request to PCF 254 to map the QoS characteristic to a QCI and to create a data flow in the network slice for UE device 110 with the QCI.

NSSF 262 may select a set of network slice instances to serve a particular UE device 110, determine network slice selection assistance information (NSSAI) or a Single-NSSAI (S-NSSA), determine a particular AMF 220 to serve a particular UE device 110, and/or perform other types of processing associated with network slice selection or management. NSSF 262 may be accessible via Nnssf interface 263. In some implementations, SMF 240 and/or gNodeB 210 may send a query to NSSF 262. NSSF 262 may select a network slice for the communication session based on the received information provided in the query.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to determine if a PEI has been blacklisted. EIR 266 may be accessible via Neir interface 267.

NWDAF 268 may collect analytics information associated with radio access network 120 and/or core network 150. For example, NWDAF 268 may collect accessibility Key Performance Indicators (KPIs) (e.g., a Radio Resource Control (RRC) connection setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi Access Point. N3IWF 274 may facilitate handovers for UE device 110 between RAN 130 and the non-3GPP access device. N3IWF 274 maybe accessible via Nn3iwf interface 275.

Although FIG. 2 shows exemplary components of core network 150, in other implementations, core network 150 may include fewer components, different components, differently arranged components, or additional components than depicted in FIG. 2. Additionally, or alternatively, one or more components of core network 150 may perform functions described as being performed by one or more other components of core network 150. For example, core network 150 may include additional function nodes not shown in FIG. 2, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 2, additionally, or alternatively, core network 150 may include a reference point architecture that includes point-to-point interfaces between particular function nodes.

Figure 3:
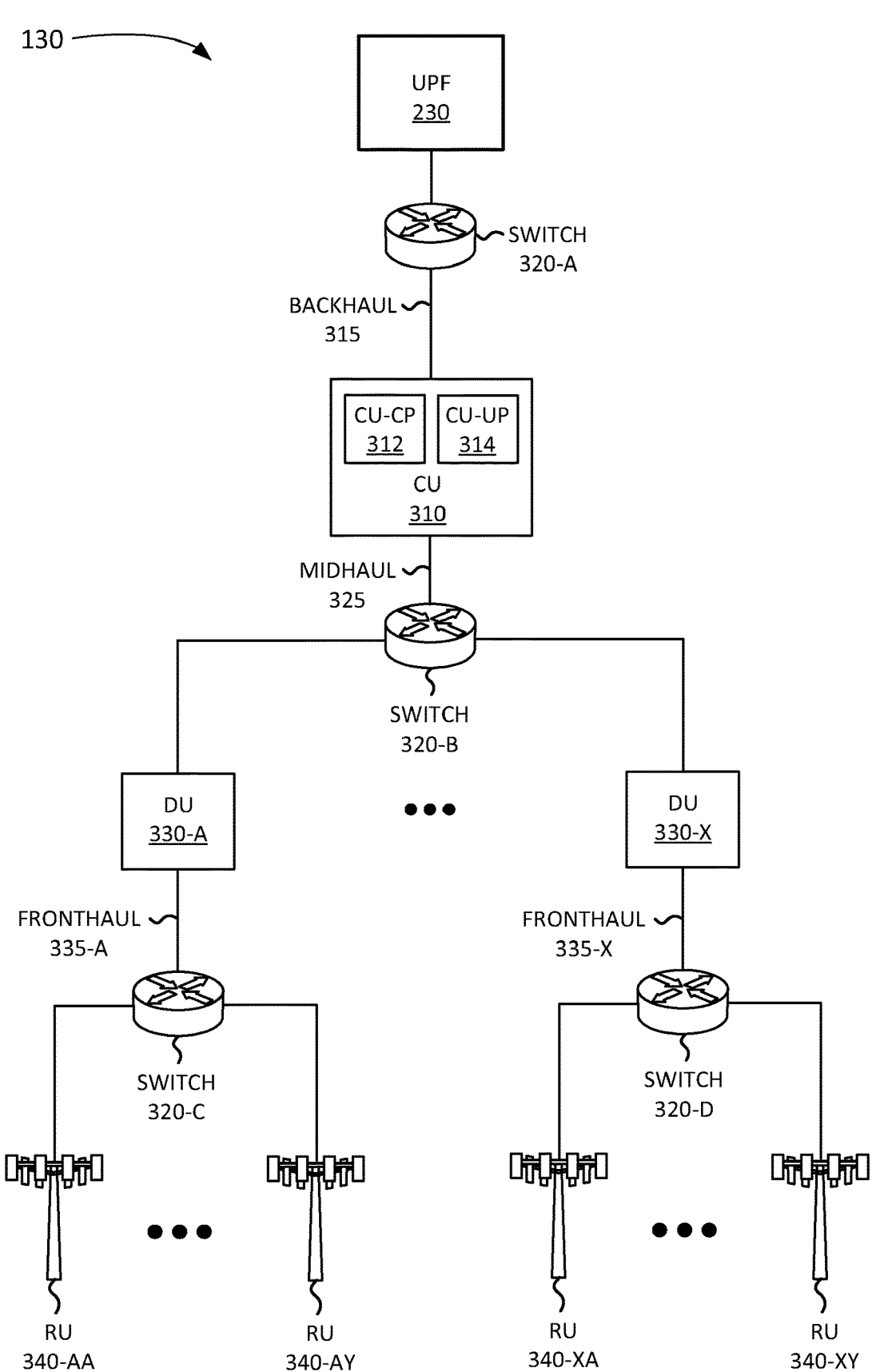
FIG. 3 illustrates exemplary components of a Radio Access Network (RAN) according to an implementation described herein.

FIG. 3 illustrates exemplary components of RAN 130 according to an implementation described herein. As shown in FIG. 3, RAN 130 may include a CU 310, switches 320A, 320-B, 320-C, and 320-D (referred to herein collectively as "switches 320" and individually as "switch 320"), DU 330-A to 330-X (referred to herein collectively as "DUs 330" and individually as "DU 330"), and RUs 340-AA to 340-XY (referred to herein collectively as "RUs 340" and individually as "RU 340").

CU 310 may include a logical node that includes the functionality for control flow processing for gNodeB 210, including, for example, the functionality to generate and/or process Radio Resource Control (RRC) protocol messages, Service Data Adaptation Protocol (SDAP) messages, and/or Packet Data Convergence Protocol (PDCP) messages. CU 310 may include CU-CP 312 and CU-UP 314. CU-CP 312 may perform control plane processing for CU 310 and may control one or more DUs 330. CU-UP 314 may perform data plane processing for CU 310, such as forwarding and/or routing messages between DU 330 and core network 130 (e.g., UPF 230). CU-CP 312 may set up PDU sessions in DU 330 and CU-UP 314. CU-CP 312 may include a RAN controller that performs network slice admission and management of data flows associated with different QoS requirements in a network slice. CU 310 may terminate an F1 interface with DU 330 and an N3 interface with UPF 230. Furthermore, while FIG. 3 shows UPF 230 connected to CU 310 via backhaul 315, in other implementations UPF 230 may be co-located with CU-UP 314.

Switches 320 may perform switching and/or routing in RAN 130. For example, switch 320-A may perform routing along backhaul 315 from CU 310 to UPF 230, switch 320-B may perform switching and/or routing along midhaul 325 between DUs 330-A to 330-X and CU 310, switch 320-C may perform switching along fronthaul 335-A between RUs 340-AA to 340-AY and DU 330-A, and switch 320-D may perform switching along fronthaul 335-X between RUs 340-XA to 340-XY and DU 330-X. While a single switch 320 is shown for backhaul 315, midhaul 325, fronthaul 335-A, and fronthaul 335-X for illustrative purposes, in practice each of backhaul 315, midhaul 325, fronthaul 335-A, and fronthaul 335-X may include multiple switches 320.

DU 330 may include a logical node that includes lower level functionality for processing (e.g., Layer 2 and/or Layer 1 processing) for gNodeB 210, including, for example, functionality to generate and/or process Radio Link Control (RLC) messages, Medium Access Control (MAC) messages, and/or physical (PHY) layer messages. DU 330 may support multiple RUs 340. RU 340 may include an RF transceiver with one or more antenna arrays.

Although FIG. 3 shows exemplary components of RAN 130, in other implementations, RAN 130 may include fewer components, different components, differently arranged components, or additional components than depicted in FIG. 3.

Figure 4:
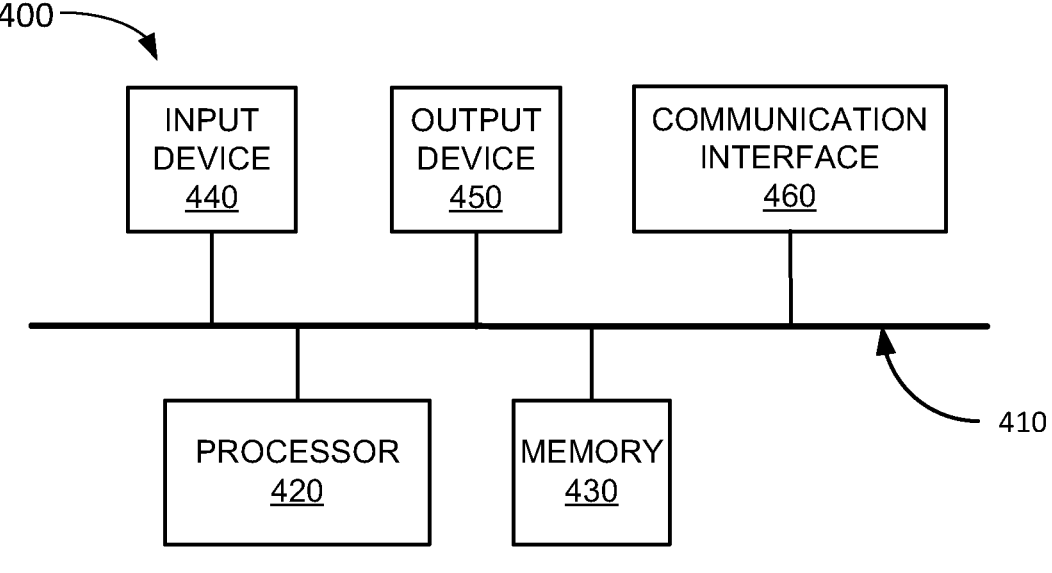
FIG. 4 illustrates exemplary components of a device that may be included in a component of an environment according to an implementation described herein.

FIG. 4 illustrates example components of a device 400 according to an implementation described herein. UE device 110, MEC device 145, application server 170, gNodeB 210, AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, N3IWF 274, CU-CP 312, CU-UP 314, switch 320, DU 330, RU 340, and/or other components of core network 150 or RAN 130, may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to RF signals and/or a receiver that converts RF signals to baseband signals. Communication interface 460 may be coupled to one or more antennas/antenna arrays for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to QoS flow control in network slices. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
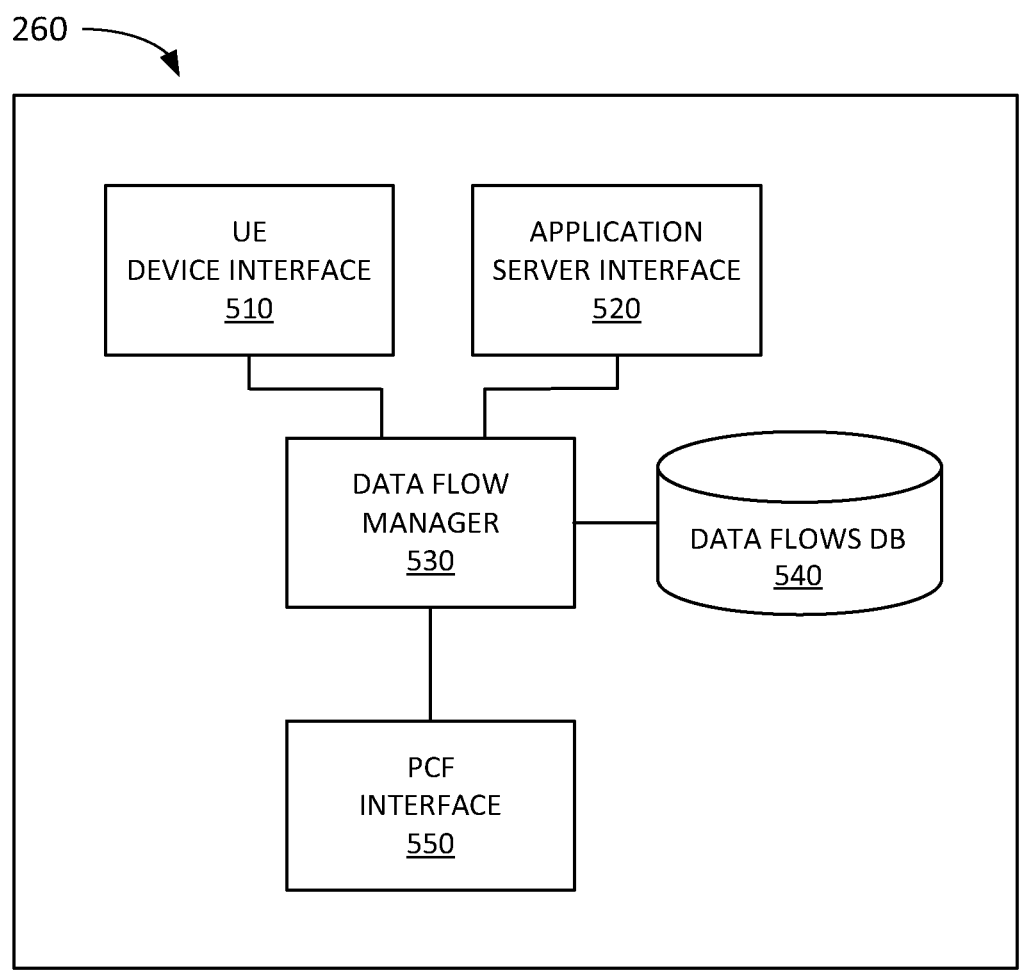
FIG. 5 illustrates exemplary components of a Network Exposure Function (NEF) according to an implementation described herein.

FIG. 5 is a diagram illustrating exemplary components of NEF 260. The components of NEF 260 may be implemented, for example, via processor 420 executing instructions from memory 430. Alternatively, some or all of the components of NEF 260 may be implemented via hard-wired circuitry. As shown in FIG. 5, NEF 260 may include a UE device interface 510, an application server interface 520, a data flow manager 530, a data flows DB 540, and a PCF interface 550.

UE device interface 510 may be configured to receive a request from UE device 110 to create a data flow, with a QoS characteristic, in a network slice. For example, when UE device 110 is admitted to a network slice (i.e., authorized to access the network slice), UE device 110 may be provided with information on how to contact NEF 260 and use the interface to request that a data flow with a QoS characteristic be created.

Application server interface 520 may be configured to communicate with application server 170. For example, application server 170 may use application server interface 520 to send a request to create a data flow for UE device 10. Furthermore, NEF 260 may send messages to application server 170 reporting data flow requests that have been received from UE device 110. Application server 170 may create a data flow to UPF 230 based on a message received from NEF 260 indicating UE device 110 has requested the data flow.

Data flow manager 530 may manage creation of data flows for UE devices 110. For example, data flow manager 530 may generate an instruction to PCF 254 to create a data flow based on a received request. Data flows DB 540 may store information relating to data flows managed by NEF 260. For example, data flows DB 540 may store, for each data flow, information identifying the data flow, such as a QoS flow ID (QFI) for the data flow, information identifying UE device 110 associated with the data flow, a QoS characteristic associated with the data flow, and/or other type of information associated with the data flow. PCF interface 550 may be configured to communicate with PCF 25. For example, PCF interface 550 may forward an instruction to PCF 254 to create a data flow with a QoS characteristic based on a received request.

Although FIG. 5 shows exemplary components of NEF 260, in other implementations, NEF 260 may include fewer components, different components, additional components, or differently arranged components than depicted in FIG. 5. Additionally, or alternatively, one or more components of NEF 260 may perform one or more tasks described as being performed by one or more other components of NEF 260.

Figure 6:
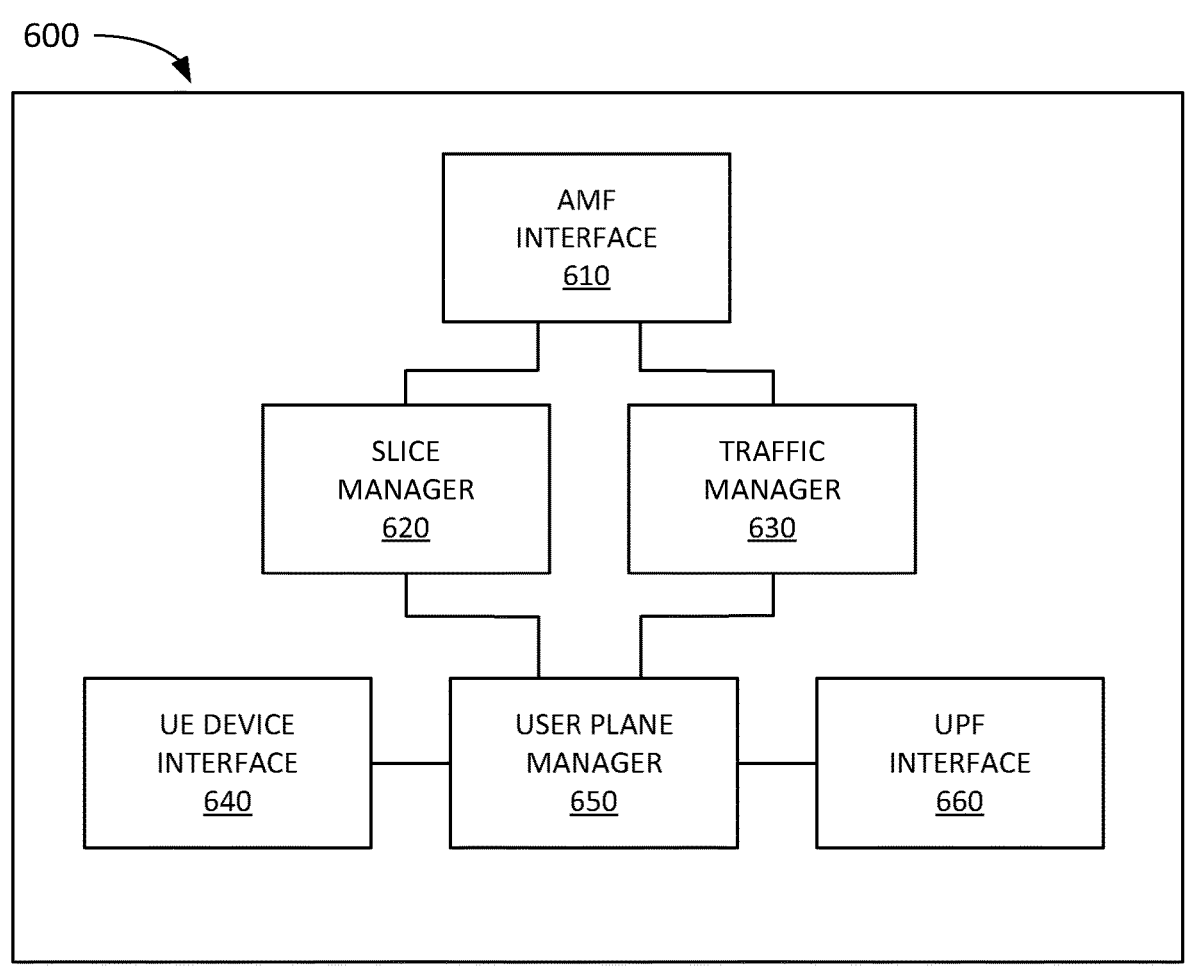
FIG. 6 illustrates exemplary components of a RAN device according to an implementation described herein.

FIG. 6 is a diagram illustrating exemplary components of a RAN controller 600 that may be included in RAN 130, such as, for example, gNodeB 210, CU-CP 312, and/or another component of RAN 130. The components of RAN controller 600 may be implemented, for example, via processor 420 executing instructions from memory 430. Alternatively, some or all of the components of RAN controller 600 may be implemented via hard-wired circuitry. As shown in FIG. 6, RAN controller 600 may include an AMF interface 610, a slice manager 620, a traffic manager 630, a UE device interface 640, a user plane manager 650, and a UPF interface 660.

AMF interface 610 may be configured to communicate with AMF 220. For example, AMF interface 610 may receive information relating to a data flow for which transport through RAN 130 is to be implemented. Slice manager 620 may manage admission of UE devices 110 (i.e., authorization to access) to a network slice. For example, slice manager 620 may process a request by UE device 110 to be admitted to a network slice and may check with UDM 252 (via AMF 220 or directly) to verify that UE device 110 is allowed to access the requested network slice, that the number of UE devices 110 connected to the network slice has not reached a limit, that the available bandwidth on the network slice is not below a threshold, and/or perform other network slice admission verifications.

Traffic manager 630 may manage transport of data flows through RAN 130. For example, traffic manager 630 may receive information relating to a data flow associated with UE device 110, such as, for example, a QFI for the data flow; information identifying UE device 110 and/or a PDU session for the data flow; a tuple for the data flow that includes a source IP address, a source port, a destination IP address, a destination port, and a protocol for the created data flow; a QCI, such as a 5QI for the data flow and one or more additional QoS parameters for the data flow, etc. Traffic manager 630 may configure user plane manager 650 to implement forwarding/routing of the data flow through RAN controller 600 while satisfying the QoS requirements associated with the data flow.

UE device interface 640 may interface with UE device 110 and may receive uplink data from UE device 110 and/or forward downlink data to UE device 110. User plane manager 650 may implement user plane forwarding/routing of PDUs in data flows based on QoS requirements associated with the data flows. UPF interface 660 may interface with UPF 230 and may receive downlink data from UPF 230 and/or forward uplink data to UPF 230.

Although FIG. 6 shows exemplary components of RAN controller 600, in other implementations, RAN controller 600 may include fewer components, different components, additional components, or differently arranged components than depicted in FIG. 6. Additionally, or alternatively, one or more components of RAN controller 600 may perform one or more tasks described as being performed by one or more other components of RAN controller 600.

Figure 7:
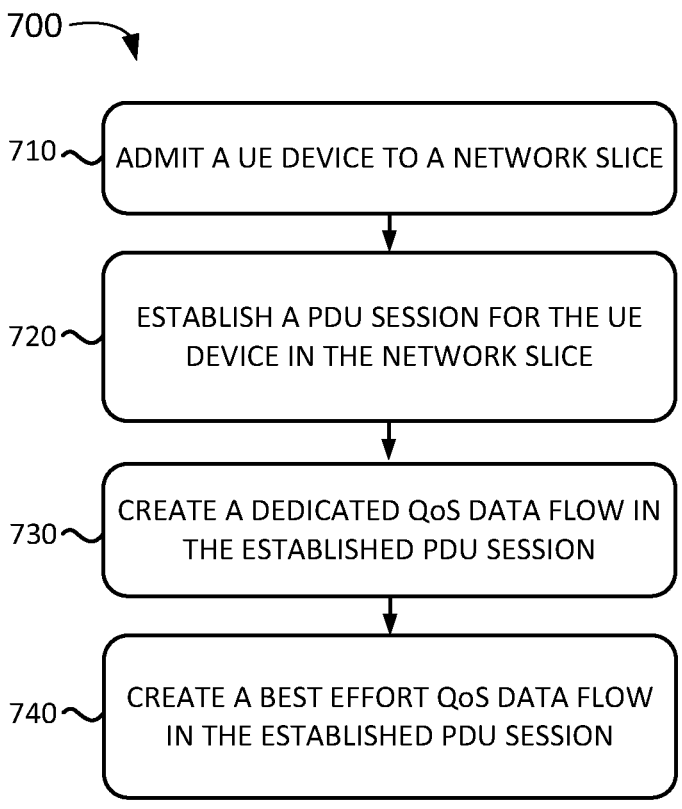
FIG. 7 illustrates a flowchart for creating multiple data flows in a network slice according to an implementation described herein.

FIG. 7 illustrates a flowchart of a process 700 for creating multiple data flows in a network slice according to an implementation described herein. In some implementations, process 700 of FIG. 7 may be performed by gNodeB 210, AMF 220, UPF 230, SMF 240, PCF 254, NEF 260, NSSF 262, and/or another component of RAN 130 or core network 150. In other implementations, some or all of process 700 may be performed by another device or a group of devices.

As shown in FIG. 7, process 700 may include admitting a UE device to a network slice (block 710). For example, gNodeB 210 may admit UE device 110 into a network slice if the network slice is in the list of network slices allowed for UE device 110, if the number of PDU sessions on the network slice has not reached a limit, and/or if the bandwidth capacity of the network slice has not reached a limit.

Process 700 may further include establishing a PDU session for the UE device 110 in the network slice (block 720) and creating a dedicated QoS data flow in the established PDU session (block 730). For example, UE device 110 may send a PDU establishment request to AMF 220, AMF 220 may send a Create Context Request to SMF 240, SMF 240 may obtain subscriber information from UDM 252, obtain policies for the PDU session from PCF 254, send a PDU session establishment message to UPF 230, receive a PDU session establishment response from UPF 230, and send a response back to AMF 220, indicating that the PDU session has been established. AMF 220 may send a PDU session response back to UE device 110 via gNodeB 210. As part of the PDU session establishment, a data flow assigned to the default QCI for the network slice may be created in the PDU session using a PDU Session Modification procedure.

Process 700 may further include creating a best effort QoS data flow in the established PDU session (block 740). For example, PCF 254 may automatically set up a best effort data flow in the PDU session. PCF 254 may send a policy update to SMF 240 SMF 240 may, in response, instruct UPF 230 to create the best effort data flow in the PDU session. UPF 230 may generate a tuple for the best effort data flow and provide the tuple to PCF 254. PCF 254 may generate a TFT based on the tuple and provide the TFT to UE device 110 via AMF 220.

FIG. 8 illustrates a flowchart for creating a data flow, with a Quality of Service (QOS) characteristic, in a network slice according to an implementation described herein. In some implementations, process 800 of FIG. 8 may be performed by gNodeB 210, AMF 220, UPF 230, SMF 240, PCF 254, NEF 260, NSSF 262, and/or another component of RAN 130 or core network 150. In other implementations, some or all of process 800 may be performed by another device or a group of devices.

As shown in FIG. 8, process 800 may include providing an interface to UE devices 11- to enable UE devices 110 to request a data flow. with a QoS characteristic, in a network slice (block 810). For example, NEF 260 may implement an interface that enables UE device 110 to request a data flow, with a QoS characteristic, in a network slice. Process 800 may further include receiving a request from a UE device via the provided interface for a data flow, with a QoS characteristic, in a network slice (block 820) and sending a message to an application server indicating that the request for the data flow has been received (block 830). For example, NEF 260 may receive a request from UE device 110 to create a data flow, with a QoS characteristic, in a network slice. The QoS characteristic may include, for example, a QoS class identifier (ID); a service requirement, such as a latency requirement, a throughput requirement, a security requirement, an error rate requirement, a packet delivery rate requirement, and/or another type of service requirement; an application ID and/or an application type ID; a Data Network Name (DNN); a destination Internet Protocol (IP) address; whether a data flow is to be routed to a Multi-access Edge Computing (MEC) network; and/or another type of QoS characteristic.

Process 800 may further include mapping the QoS characteristic to a QCI (block 840) and creating a data flow with the QCI in a PDU session associated with the UE device in the network slice (block 850). For example, NEF 260 may send a request to PCF 254 to create a data flow with the QoS characteristic for UE device 110 in the network slice. PCF 254 may map the QoS characteristic to a QCI, such as a 5QI, as well as one or more additional QoS parameters that may be required to implement a data flow such as, for example, an Allocation and Retention Priority (ARP) value that defines a relative importance of data flow in light of resource limitations; a Reflective QoS Attribute (RQA) value that indicates whether QoS of downlink traffic to UE device 110 is reflected on uplink traffic; a Guaranteed Flow Bit Rate (GFBR) value; a Notification Control value that indicates whether notifications are requested from the RAN when the GFBR cannot be guaranteed; one or more Aggregate Maximum Bit Rate (AMBR) values, such as a per session AMBR, a per UE AMBR, etc.; a Maximum Packet Loss Rate (MPLR) value; and/or other types of QoS parameter values.

PCF 254 may then send an instruction to SMF 240 to create the data flow and SMF 240 may instruct UPF 230 to create the data flow with the mapped QCI. UPF 230 may provide information identifying the created data flow to PCF 254, such as, for example, a tuple (e.g., source IP address, source port, destination IP address, destination port, protocol) for the created data flow. PCF 254 may generate a TFT filter for the data flow based on the received information, provide information relating to the created data flow to CU-CP 312 and gNodeB 210 via AMF 220, and provide the created TFT to UE device 110 via AMF 220 and gNodeB 210.

Figure 9:
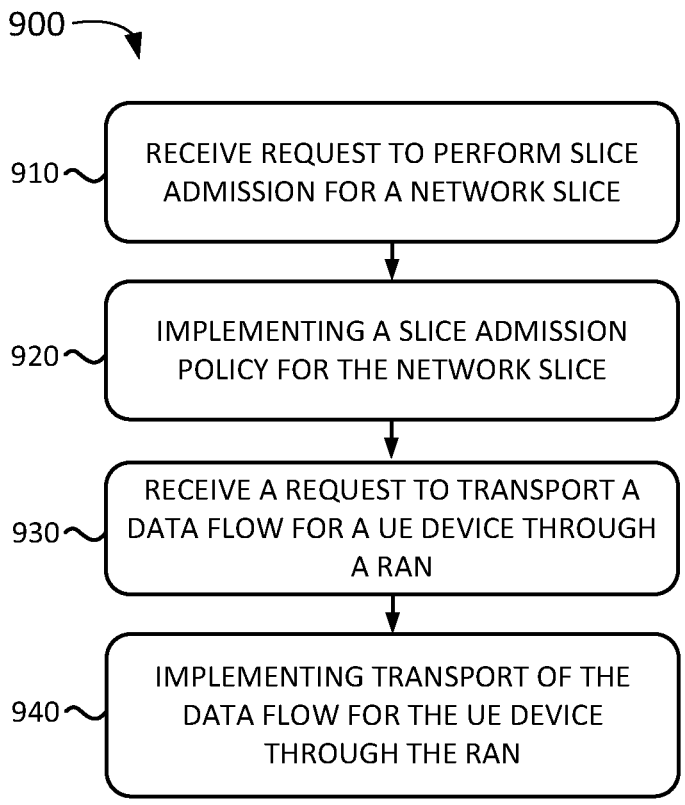
FIG. 9 illustrates a flowchart for implementing transport of a data flow with a QoS characteristic in a RAN according to an implementation described herein.

FIG. 9 illustrates a flowchart for implementing transport of a data flow, with a QoS characteristic, in a RAN according to an implementation described herein. In some implementations, process 900 of FIG. 9 may be performed by gNodeB 210, CU-CP 312, and/or another component of RAN 130. In other implementations, some or all of process 900 may be performed by another device or a group of devices.

As shown in FIG. 9, process 900 may include receiving a request to perform slice admission of UE device 110 to a network slice (block 910) and implementing a slice admission policy for the network slice (block 920). For example, gNodeB 210 or CU-C 312 may admit UE device 110 into a network slice by checking whether UE device 110 is allowed to access the requested network slice, that the number of UE devices 110 connected to the network slice has not reached a limit, that the available bandwidth on the network slice is not below a threshold, and/or by performing other network slice admission verifications.

Process 900 may further include receiving a request to transport a data flow for a UE device through a RAN (block 930) and implementing the transport of the data flow for the UE device through the RAN (block 940). That is, the request is to have the RAN maintain the data flow through the RAN. For example, gNodeB 210 or CU-C 312 may receive a request from AMF 220 to implement transport of PDUs of a data flow, for UE device 110, in a network slice. The request may include information identifying the created data flow, such as the QFI for the data flow, a tuple, information identifying the QCI and/or other QoS parameters associated with the created data flow, and/or other types of information associated with the data flow. gNodeB 210 or CU-C 312 may then configure user plane manager 650 to implement the routing/forwarding of the PDUs of the data flow while satisfying the QoS requirements for the date flow based on the 5QI and/or other QoS parameters.

Figure 10A:
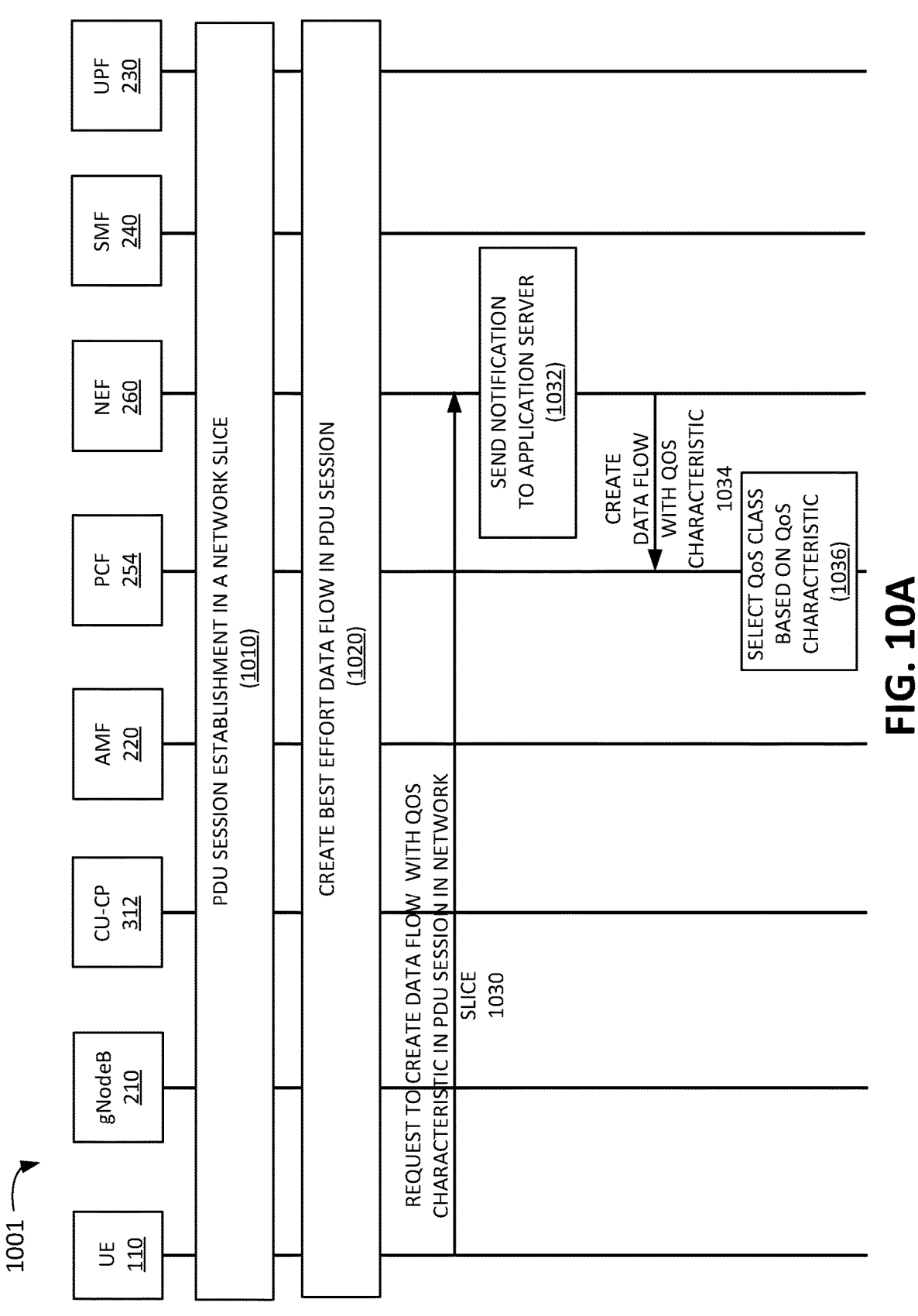
FIGS. 10A and 10B illustrate an exemplary signal flow according to an implementation described herein.
Figure 10B:
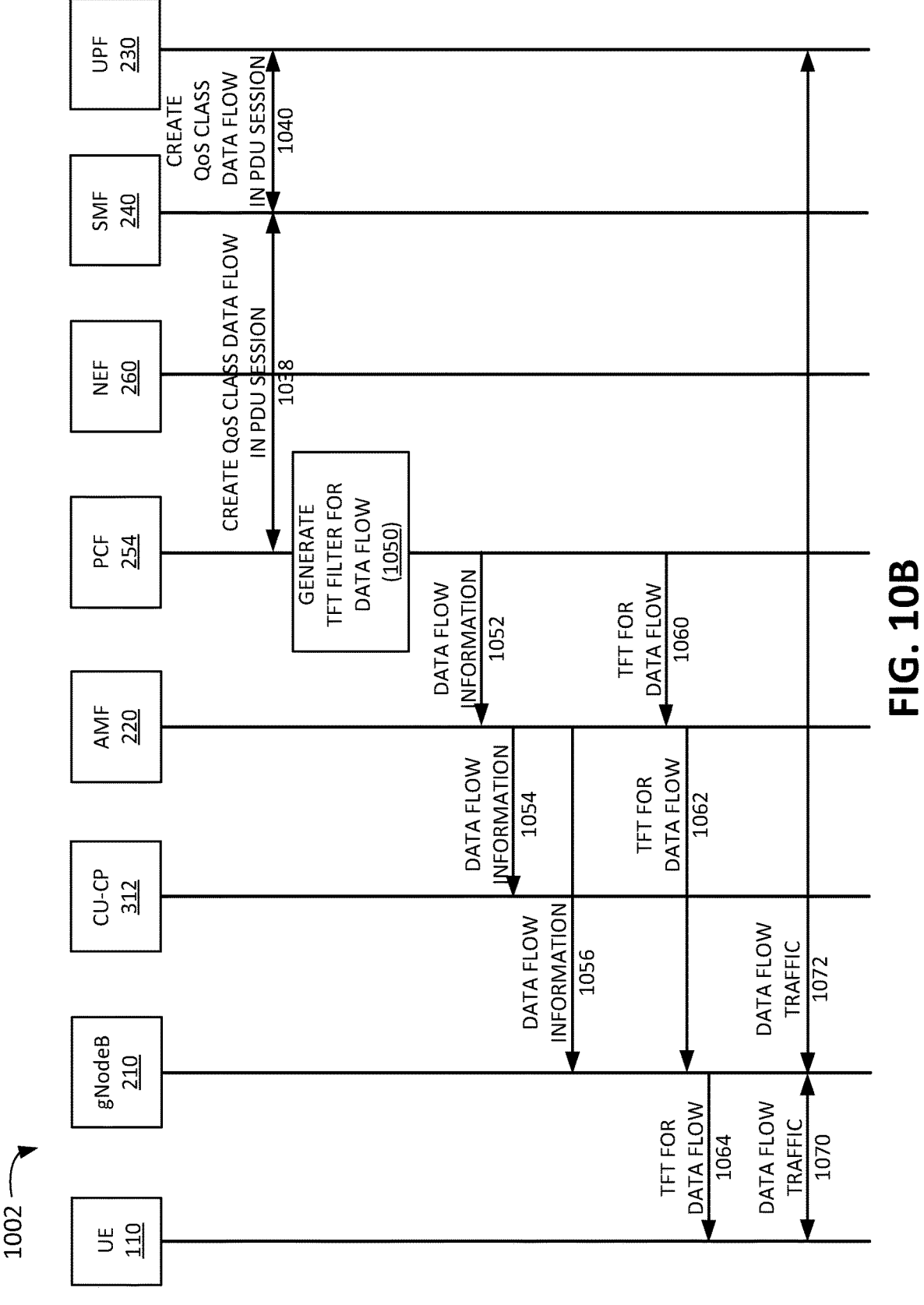

FIGS. 10A and 10B illustrate exemplary signal flows 801 and 802 according to an implementation described herein. Signal flows 801 and 802 do not illustrate all signals sent during the process described below. For example, calls to NRF 258 to identify an appropriate NF for a particular service are not shown. As shown in FIG. 10A, signal flow 801 may include admitting a UE device 110 onto a network slice and performing a PDU session establishment in the network slice (block 1010). For example, UE device 110 may attach to gNodeB 210 and request a PDU session in a network slice. gNodeB 210 and/or CU-CP 312 may check to make sure UE device 110 is allowed to access the requested network slice, that the number of UE devices 110 connected to the network slice has not reached a limit, that the available bandwidth on the network slice is not below a threshold, and/or perform other network slice admission verifications.

A PDU session establishment procedure may then be carried out. For example, UE device 110 may send a Radio Resource Control (RRC) PDU session establishment request to AMF 220 via gNodeB 210 to establish a PDU session in the network slice with a default QCI for the network slice. AMF 220 may send a Create Context Request to SMF 240. SMF 240 may obtain subscriber information from UDM 252, select PCF 254, obtain policies for the PDU session from the selected PCF 254, select UPF 230, send a PDU session establishment message to UPF 230, receive a PDU session establishment response from UPF 230, and send a response back to AMF 220 indicating that the PDU session has been established. AMF 220 may send a PDU session response back to UE device 110 via gNodeB 210. As part of the PDU session establishment, a data flow assigned to the default QCI for the network slice may be created in the PDU session (e.g., in the GTP tunnel established for the PDU session) using a PDU Session Modification procedure.

PCF 254 may then automatically set up a best effort data flow in the PDU session based on a PCF policy included with the deployed network slice (block 1020). PCF 254 may send a policy update to SMF 240 SMF 240 may, in response, instruct UPF 230 to create the best effort data flow in the PDU session. UPF 230 may generate a tuple for the best effort data flow and provide the tuple to PCF 254. PCF 254 may generate a TFT based on the tuple and provide the TFT to UE device 110 via AMF 220.

At a later time, UE device 110 may request an additional data flow. For example, an application on UE device 110 may activate a low latency communication with a different low latency requirement than the default QCI for the network slice. UE device 110 may use an interface provided by NEF 260 to request a data flow with a QoS characteristic (signal 1030). NEF 260 may send a notification to application server 170 associated with the PDU session, indicating the request has been received from UE device 110 (block 1032). In response, application server 170 may create a data flow satisfying the QoS characteristic from application server 170 to UPF 230 (not shown in FIG. 10A).

In response to receiving the request from UE device 110, NEF 260 may send a request to create a data flow with the QoS characteristic to PCF 254 (signal 1034). PCF 254 may map the QoS characteristic to a QCI and may determine other QoS parameters associated with the QoS characteristic (e.g., an ARP value, an RQA value, a GFBR value, an AMBR value, an MPLR value, etc.) for the requested data flow (block 1036).

Continuing to FIG. 10B, signal flow 802 may include creating the data flow with the mapped QCI by sending a request to SMF 240 (signal 1038) and SMF 240 may instruct UPF 230 to create the data flow with the mapped QCI (signal 1040). UPF 230 may provide information identifying the created data flow to PCF 254, such as, for example, a tuple that includes a source IP address, a source port, a destination IP address, a destination port, and a protocol for the created data flow. PCF 254 may generate a TFT filter for the data flow based on the received information (block 1050) and provide information relating to the created data flow to CU-CP 312 and gNodeB 210 via AMF 220 (signals 1052, 1054, and 1056). The information may include information identifying the created data flow, such as the received tuple, and/or information identifying the QCI and/or other QoS parameters associated with the created data flow.

Furthermore, PCF 254 may provide the created TFT to UE device 110 via AMF 220 and gNodeB 210 (signals 1060, 1062, and 1064). UE device 110 may then use the received TFT to assign packets to the created data flow and/or to identify received packets via the data flow and send and receive packets via the data flow to and from UPF 230 (signals 1070 and 1072) through core network 150. UPF 230 may route the data flow to PDN 160 and application server 170 (not shown in FIG. 10B).

Figure 11:
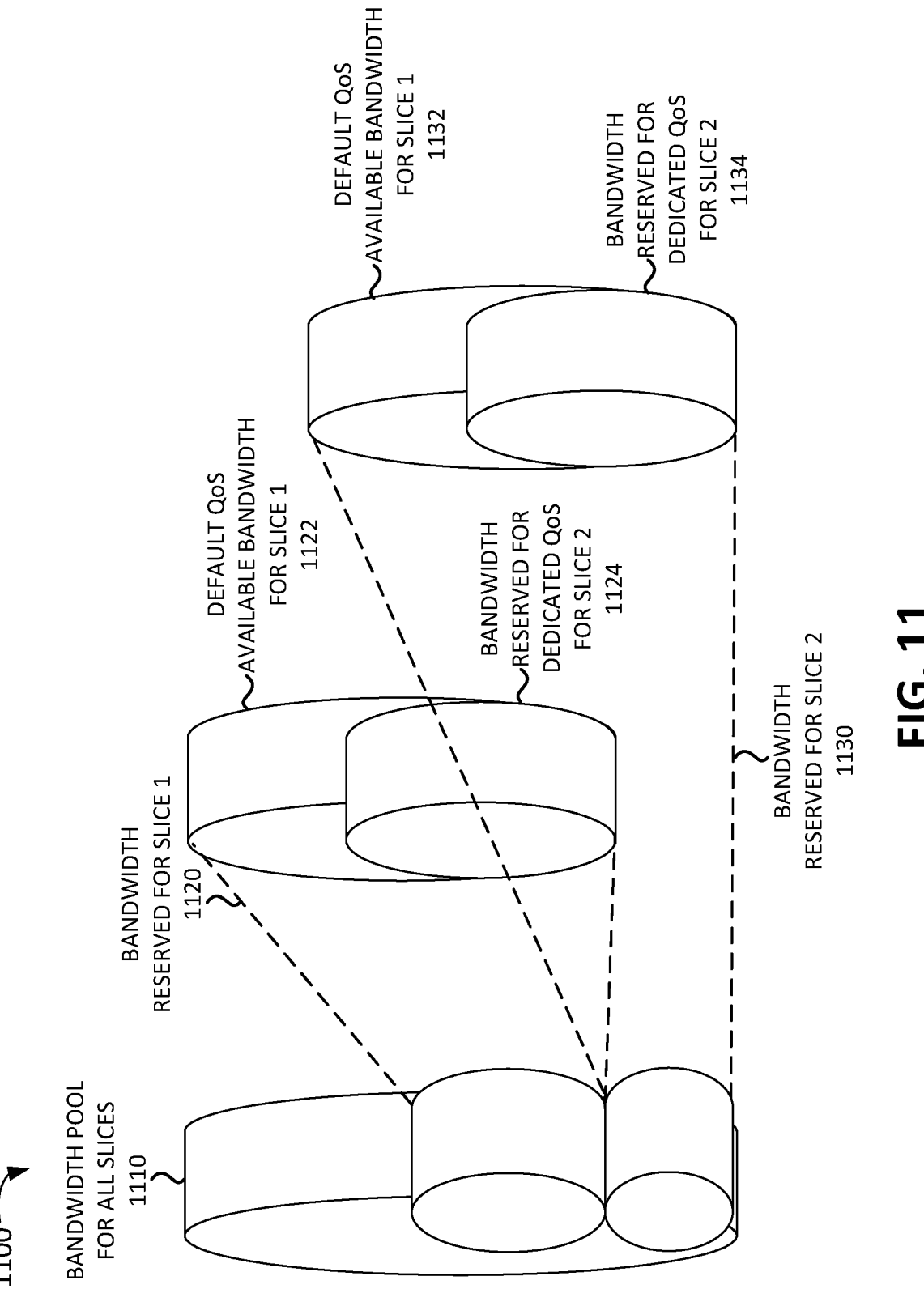
FIG. 11 illustrates an exemplary reservation of bandwidth resources for network slices according to an implementation described herein.

FIG. 11 illustrates an exemplary reservation of bandwidth resources 1100 for network slices according to an implementation described herein. As shown in FIG. 11, bandwidth resources 1100 include a bandwidth pool for all network slices 1110 based on the network bandwidth capacity of RAN 130 and core network 150. Each deployed network slice may be allocated a portion of the total bandwidth pool. For example, network slice 1 may be allocated reserved bandwidth 1120 and network slice 2 may be allocated reserved bandwidth 1130. The reserved bandwidth for a network slice may be allocated when the network slice is deployed on RAN 130 and/or core network 150.

Within each network slice, different QoS classes may allocated different portions of the reserved bandwidth for the network slice. For example, the bandwidth reserved for dedicated QoS 1124 for network slice 1 may be a portion of reserved bandwidth 1120 for network slice 1, leaving an available bandwidth for data flows assigned to different QCIs. Similarly, a bandwidth reserved for dedicated QoS 1134 for network slice 2 may be a portion of reserved bandwidth 1130 for network slice 2, leaving an available bandwidth for data flows assigned to different QCIs. The portion of reserved bandwidth 1120 or 1130 allocated for the default QCI associated with a network slice may be configured when a network slice is deployed and/or when UE device 110 is admitted to the network slice and a PDU session is established. For example, PCF 254 may instruct SMF 240 how much bandwidth to allocate when a PDU session and/or a default data flow is established in a network slice.

FIG. 12 illustrates an exemplary set 1200 of network slices with multiple QoS classes according to an implementation described herein. As shown in FIG. 12, set 1200 may include a gaming network slice 1210 and a V2X network slice 1220. Gaming network slice 1210 may include at least three different QoS classes. QCI 8 may be assigned to best effort traffic, a traffic for updating firmware, and a traffic for downloading applications. QCI 133 may be assigned to a low latency traffic for real-time gaming and may be associated with a first latency requirement. QCI 80 may be assigned to a low latency traffic for augmented and virtual reality and may be associated with a second latency requirement that is different than the first latency requirement.

V2X network slice 1220 may include at least three different QoS classes. QCI 8 may be assigned to a best effort traffic and a traffic for updating automobile firmware. QCI 133 may be assigned to low safety messages and may be associated with a first latency requirement. QCI 179 may be assigned to low latency traffic collision avoidance messages and may be associated with a second latency requirement that is different than the first latency requirement.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7, 8, and 9, and a series of signals have been described with respect to FIGS. 10A and 10B, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

providing, by at least one device, an interface that enables a user equipment (UE) device to request a network exposure function (NEF) to create a data flow in a network slice;

receiving, by the at least one device, a request from the UE device via the provided interface to create the data flow in the network slice, wherein the data flow is associated with a Quality of Service (QOS) characteristic;

mapping, by the at least one device, the QoS characteristic to a QoS identifier; and creating, by the at least one device, a data flow associated with the QoS identifier in a communication session associated with the UE device in the network slice, wherein mapping the QoS characteristic to the QoS identifier includes:

sending, by the NEF, an instruction to a Policy Control Function (PCF) to map the QoS characteristic to the QoS identifier.

2. The method of claim 1, further comprising:

admitting the UE device to the network slice;

establishing a Protocol Data Unit (PDU) session for the UE device in the network slice, in response to admitting the UE to the network slice;

creating a dedicated QOS data flow within the established PDU session, wherein the dedicated QoS data flow is associated with a QoS identifier that has a higher priority than a best effort QoS data flow; and creating a best effort QoS data flow within the established PDU session.

3. The method of claim 1, wherein the communication session includes a low latency data flow, and wherein the created data flow is associated with a latency requirement that is different from a latency requirement associated with the low latency data flow.

4. The method of claim 1, wherein creating the data flow associated with the QoS identifier in the communication session associated with the UE device in the network slice includes:

sending, by the NEF and to an application server device in a data network associated with the communication session, an indication that the request to create the data flow has been received from the UE device.

5. The method of claim 1, wherein creating the data flow associated with the Qos identifier in the communication session associated with the UE device in the network slice includes:

sending, by a Policy Control Function (PCF) and to a Session Management Function (SMF) associated with the communication session, an instruction to create the data flow associated with the QoS identifier.

6. The method of claim 1, wherein creating the data flow associated with the QoS identifier in the communication session associated with the UE device in the network slice includes:

creating, by a Policy Control Function (PCF), a traffic flow template (TFT) for the data flow associated with the QoS identifier; and providing, via an Access and Mobility Function (AMF), the created TFT to the UE device, where the UE device is to use the created TFT to assign data packets to the created data flow associated with the QoS identifier.

7. The method of claim 1, wherein creating the data flow associated with the QoS identifier in the communication session associated with the UE device in the network slice includes:

providing, via an Access and Mobility Function (AMF), information identifying the data flow associated with the QoS identifier to a Radio Access Network (RAN) controller associated with a base station to which the UE device is attached.

8. The method of claim 1, wherein creating the data flow associated with the QoS identifier in the communication session associated with the UE device in the network slice includes:

providing, via an Access and Mobility Function (AMF), information identifying the data flow associated with the QoS identifier to a Central Unit Control Plane (CU-CP) associated with a base station to which the UE device is attached.

9. A system comprising at least one device, the at least one device comprising:

a processor configured to:
provide an interface that enables a user equipment (UE) device to request a network exposure function (NEF) to create a data flow in a network slice;

receive a request from the UE device via the provided interface to create the data flow in the network slice, wherein the data flow is associated with a Quality of Service (QoS) characteristic;

map the QOS characteristic to a QoS identifier; and create a data flow associated with the QoS identifier in a communication session associated with the UE device in the network slice, wherein, when mapping the QoS characteristic to the QoS identifier, the processor is further configured to:

send, via the NEF, an instruction to a Policy Control Function (PCF) to map the QOS characteristic to the QoS identifier.

10. The system of claim 9, wherein the processor is further configured to:

admit the UE device to the network slice;

establish a Protocol Data Unit (PDU) session for the UE device in the network slice, in response to admitting the UE to the network slice;

create a dedicated QoS data flow within the established PDU session, wherein the dedicated QoS data flow is associated with a QoS identifier that has a higher priority than a best effort QoS data flow; and create a best effort QoS data flow within the established PDU session.

11. The system of claim 9, wherein the communication session includes a low latency data flow, and wherein the created data flow is associated with a latency requirement that is different from a latency requirement associated with the low latency data flow.

12. The system of claim 9, wherein, when creating the data flow associated with the QoS identifier in the communication session associated with the UE device in the network slice, the processor is further configured to:

send, by the NEF and to an application server device in a data network associated with the communication session, an indication that the request to create the data flow has been received from the UE device.

13. The system of claim 9, wherein, when creating the data flow associated with the QoS identifier in the communication session associated with the UE device in the network slice, the processor is further configured to:

send, by a Policy Control Function (PCF) and to a Session Management Function (SMF) associated with the communication session, an instruction to create the data flow associated with the QoS identifier.

14. The system of claim 9, wherein, when creating the data flow associated with the QoS identifier in the communication session associated with the UE device in the network slice, the processor is further configured to:

create, by a Policy Control Function (PCF), a traffic flow template (TFT) for the data flow associated with the QoS identifier; and provide, via an Access and Mobility Function (AMF), the created TFT to the UE device, where the UE device is to use the created TFT to assign data packets to the created data flow associated with the QoS identifier.

15. The system of claim 9, wherein, when creating the data flow associated with the QoS identifier in the communication session associated with the UE device in the network slice, the processor is further configured to:

provide, via an Access and Mobility Function (AMF), information identifying the data flow associated with the QoS identifier to a Radio Access Network (RAN) controller associated with a base station to which the UE device is attached.

16. The system of claim 9, wherein, when creating the data flow associated with the QoS identifier in the communication session associated with the UE device in the network slice, the processor is further configured to:

provide, via an Access and Mobility Function (AMF), information identifying the data flow associated with the QoS identifier to a Central Unit Control Plane (CU-CP) associated with a base station to which the UE device is attached.

17. A non-transitory computer-readable memory device storing instructions executable by one or more processors, the non-transitory computer-readable memory device comprising:

one or more instructions to provide an interface that enables a user equipment (UE) device to request a network exposure function (NEF) to create a data flow in a network slice;

one or more instructions to receive a request from the UE device via the provided interface to create the data flow in the network slice, wherein the data flow is associated with a Quality of Service (QOS) characteristic;

one or more instructions to map the QoS characteristic to a QoS identifier; and one or more instructions to create a data flow associated with the QoS identifier in a communication session associated with the UE device in the network slice, wherein the one or more instructions to map the QoS characteristic to a QoS identifier include:

one or more instructions to send, via the NEF, an instruction to a Policy Control Function (PCF) to map the QoS characteristic to the QoS identifier.

18. The non-transitory computer-readable memory device of claim 17, further comprising:

one or more instructions to admit the UE device to the network slice;

one or more instructions to establish a Protocol Data Unit (PDU) session for the UE device in the network slice, in response to admitting the UE to the network slice;

one or more instructions to create a dedicated QoS data flow within the established PDU session, wherein the dedicated QoS data flow is associated with a QoS identifier that has a higher priority than a best effort QoS data flow; and one or more instructions to create a best effort QoS data flow within the established PDU session.

19. The non-transitory computer-readable memory device of claim 17, wherein the communication session includes a low latency data flow, and wherein the created data flow is associated with a latency requirement that is different from a latency requirement associated with the low latency data flow.

20. The non-transitory computer-readable memory device of claim 17, wherein the one or more instructions to create the data flow associated with the QoS identifier in the communication session associated with the UE device in the network slice include:

one or more instructions to send, via the NEF and to an application server device in a data network associated with the communication session, an indication that the request to create the data flow has been received from the UE device.

* * * * *